Feb. 9, 1971 D. R. SESSLER 3,561,270
AGE INDICATING DEVICE
Filed June 26, 1968

INVENTOR.
DONALD R. SESSLER
BY
ATTORNEY.

United States Patent Office 3,561,270
Patented Feb. 9, 1971

3,561,270
AGE INDICATING DEVICE
Donald R. Sessler, Temple City, Calif., assignor to Dynametric, Inc., Pasadena, Calif., a corporation of California
Filed June 26, 1968, Ser. No. 740,053
Int. Cl. G01k 3/04, 7/24
U.S. Cl. 73—362                         12 Claims

ABSTRACT OF THE DISCLOSURE

An age indicator is provided for ascertaining the effect of exposure of articles, particularly unused photographic sheet material, to varying temperature conditions on the useful life of the article. A voltage is developed as a function of the temperature conditions to which the article is exposed at various times. This voltage is applied to a circuit that includes a diode for developing an electrical current proportional to the aging rate and this current is integrated as a function of time to produce the desired indication of the aging of the article.

---

This invention relates to a method and apparatus for measuring the amount of exposure of various kinds of articles, particularly photographic sheet material, to varying temperature conditions which cause the articles to deteriorate, or age, at different rates depending upon the temperature.

It is well known that many kinds of articles, such as unused photographic sheet material, food, and chemicals, deteriorate with age. Furthermore, it is well known that the rate of deterioration varies greatly with temperature. The invention will be described with particular reference to photographic film. Unless otherwise stated, the term photographic film as used herein refers to unexposed photographic film, that is, film that has not been exposed to light and to exposed photographic film that has not yet been processed.

Manufacturers often date packages of film to indicate the time before which the film should be used or developed, with the expectation that its original photographic properties still remain. Such dating often assumes that the film is stored at normal atmospheric temperature or thereabouts most of the time before it is actually used. But such dating is unreliable if the film is exposed to unanticipated extreme temperature conditions. Where widely different but unknown temperature conditions are anticipated, the film cannot be so dated. For this reason manufacturers often supply data as to the life to be expected if the film is stored at different temperatures. For example, the life may be two years or two weeks depending on the temperature of storage.

As used here with reference to photographic film, the term specified or rated life means the period during which it is considered that the film may almost certainly be used successfully, if it has been stored at a specified temperature. While film may often be used at a later time with some degree of success, it is customary to specify a life, that is, a useful life, or life expectancy. The specified or rated life applies only if the film is maintained at the specified temperature.

By way of example, one type of photographic film, to which the invention has been applied, had a specified life of 6900 hours at 80° F. and a specified life of 1080 hours at 100° F. The life of this film over a range of temperatures, including temperatures such as 80° and 100° is reduced by a factor of 2 when the temperature is increased by about 7.2° F.

In order to facilitate the explanation of this invention it is desirable to introduce several terms to describe the aging properties of the article being tested. Three of these terms are standard age unit, aging rate, and doubling temperature.

In effect, the aging, or deterioration, rate of an object varies with temperature. By way of example, in the case of the film mentioned, the aging rate is twice as great at 80° F. as it is at 72.8° F. The temperature rise that causes the aging rate to double is referred to as the aging-rate doubling temperature. In this case, the doubling temperature is 7.2° F.

Inasmuch as the expected life of an article, such as a spool of photographic film, varies with temperature, it is desirable to describe the amount of life consumed as a result of exposure to varying temperature conditions and the amount of life remaining, in terms of the specified life at a particular temperature. For example, in the case of the photographic film mentioned, the life may be considered that which is specified for the film at 80° F. For convenience we refer to each hour of life at that temperature as a standard age unit. This film mentioned above, then, has a life of 6900 standard age units. This is the life of the film in terms of standard age units, regardless of the temperature to which the film is exposed. By way of example, if this particular film is stored at 72.8° F. for 100 hours, only about 50 standard age units are expended. This is because the aging rate at 72.8° F. is only one-half of the aging rate at 80° F. Similarly, if the film is stored at 116° F. for about 72 hours, a total of about 2304 (that is 72×32) standard age units are consumed. Stated differently, each day of storage at about 116° F. is equivalent to about one month of storage at about 80° F. It is therefore clear that it is important that account be taken of the temperature history of a roll of photographic film before using it for its intended purpose.

If one maintains records of the temperature to which the film is exposed and the periods of exposure to different temperatures, he may be able to estimate the residual specified life of the film remaining after such exposure. To say the least, this method of determining residual film life is rather tedious. Furthermore, it is unsuitable for use where the temperature history of the film is unknown.

One object of this invention is to provide a simple, inexpensive, lightweight, compact device which produces an indication that represents the cumulative effect of exposure of an article to widely different temperature conditions.

Another purpose is to provide a new method of depositing material electrochemically in order to measure the extent to which an article has aged when exposed to changing temperature conditions.

In this invention we ascertain the aging rate of an object at various temperatures and we determine from these rates and the temperature history of the article the total number of standard age units that have been expended as a result of the temperature history. From this the residual specified life of the object can be estimated in standard age units.

The foregoing and other advantages, features, and characteristics of this invention are described below in connection with the following drawings wherein.

In this invention a simple age indicator is employed to integrate the aging effect of varying temperature conditions on the article being monitored. In the age indicator of this invention an electrical current is developed which is proportional to the aging rate of the object at each temperature, and this current is integrated in an electrochemical microcoulometer. The time integral so produced is proportional to the change in age in standard age units that have been consumed. This amount subtracted from the total specified life represents the residual specified life of the article in standard age units. In this invention, the change in current is achieved by changing a voltage as a function of temperature and applying the voltage to a non-ohmic resistor to produce to current which is proportional to the aging rate, and integrating this current.

In the best embodiment of the invention, the non-ohmic resistor has a resistance which falls rapidly as the voltage is increased, thus making it possible to match the aging characteristic of an article whose aging rate varies rapidly with temperature. In the best embodiment of the invention the non-ohmic resistor is provided by a forwardly connected diode of the semiconductive type.

A diode of the type employed in this invention is a semiconductive device in which two bodies of semiconductive material of different types are in contact with each other and are connected between two terminals or leads. When current flows in one direction the resistance of the device is relatively low. This is the "forward" direction. When the current flows in the other direction the resistance is very high. This is referred to as the "reverse" direction. In a diode, the resistance, that is, the ratio of voltage to current depends upon the voltage. This effect is very prominent in a forward connected diode. In practice, the resistance of a diode also depends upon the temperature.

In this invention, use is made of the fact that a rapid change in resistance can be achieved by a change of voltage whether or not the temperature of the diode changes. In one way of practicing the invention the diode is exposed to the same temperature as the article being monitored. In other cases the diode may be maintained at some standard temperature. The invention will be described primarily with reference to an age indicator which is exposed to the same temperature conditions as the object being tested.

Figure 1:
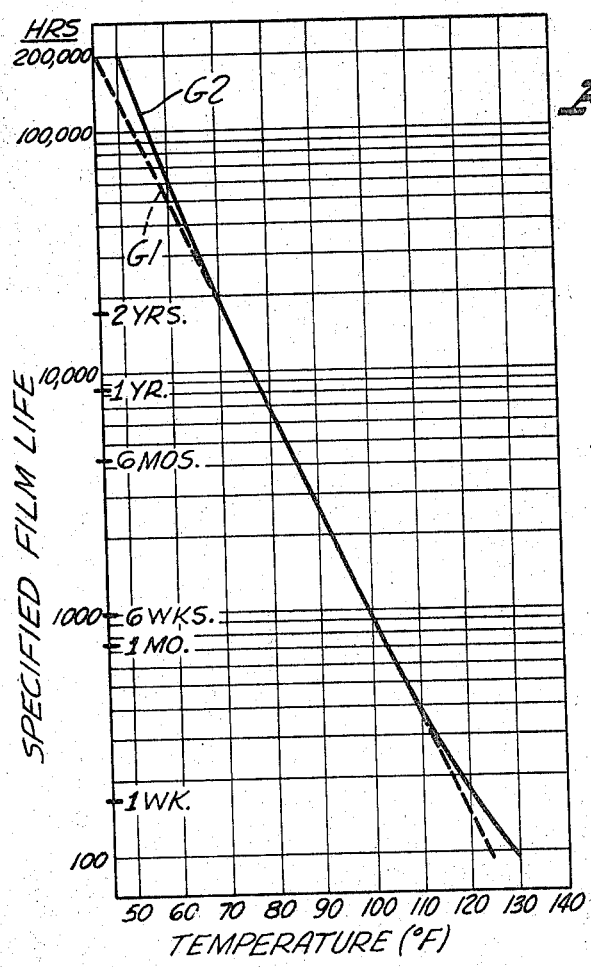
FIG. 1 is a graph indicating how the specified life of a particular photographic film varies with temperature, and how accurate the life is indicated with the specific age indicator described below.

In FIG. 1, the life expectancy of a particular film is shown as a function of temperature as Graph G1. This graph represents how the shelf life specified by the manufacturer varies with temperature. The film having the characteristic represented in FIG. 1, has an aging rate which varies rapidly with temperature. The doubling temperature is nearly constant, being about 7.2° F. through a wide range of temperature from about 50° F. to about 130° F. The aging characteristics of this film can be approximately matched over that temperature range with an age indicator embodying this invention.

Figure 2:
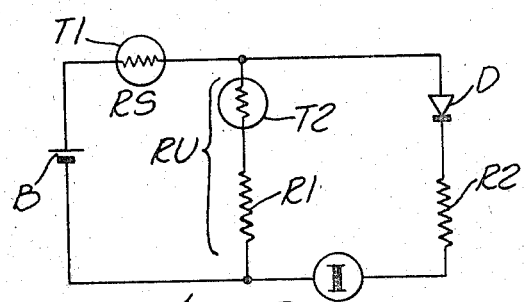
FIG. 2 is a schematic diagram of an electrical circuit embodying this invention.

In the embodiment of the age indicator illustrated in FIG. 2, a shunt circuit RU is connected in series with a series circuit RS across a small battery B. A diode D, a fixed resistor R2, and a microcoulometer I in the form of an electrochemical cell that operates on the principles of Faraday's Law, are connected in series across the ends of the shunt circuit RU. The diode is connected in the forward direction.

The series circuit RS and the shunt circuit RU have different resistance-temperature characteristics so that the voltage appearing across the shunt circuit RU varies with temperature. In one embodiment of the invention the series circuit RS consists of a thermistor T1 and the shunt circuit RU consists of a fixed resistance R1 connected in series with another thermistor T2. The elements are so selected that as the temperature rises, the voltage across the shunt circuit RU increases. The diode D, which is of the semiconductive type, constitutes a non-ohmic resistor. The conductivity of the diode depends upon the voltage across it as well as its temperature, in this case, depending primarily upon the voltage across the shunt circuit RU.

The microcoulometer I constitutes a time-current integrator. The best type of microcoulometer now known is in the form of an electrochemical cell which operates in accordance with Faraday's Law and which has come to be commonly known as a Curtis meter. Microcoulometers of this type are described for example in Beusman Patent No. 3,343,083 and John Patent No. 3,344,343.

Figure 3:
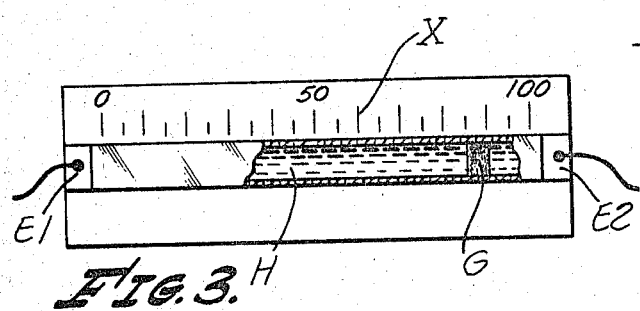
FIG. 3 is a diagram representing an integrator of the type employable in this invention.

As indicated in FIG. 3 such a Curtis meter comprises essentially a transparent capillary tube having two electrical terminals E1 and E2 at opposite ends of the bore H, with a body of liquid mercury (Hg) nearly filling the bore H in the space between the terminals. The unoccupied portion forms a gap G which is filled with an electrolyte such as a water solution of a suitable mercury salt.

As is well known, when electrical current flows through such a cell from one terminal to the other, mercury atoms are transported across the liquid gap G causing the gap to move from one end of the cell to the other. This is a slow process and is therefore very appropriately used in determining the total electrical charge that has flowed through the cell over a long time. In this invention the rate of movement of the gap is always substantially proportional to the aging rate at all temperatures. Consequently, the amount of gap movement represents the time integral of the aging rate, that is the change in age in standard age units. The resistor R2 had a resistance of about 1000 ohms which was also independent of temperature.

Figure 4:
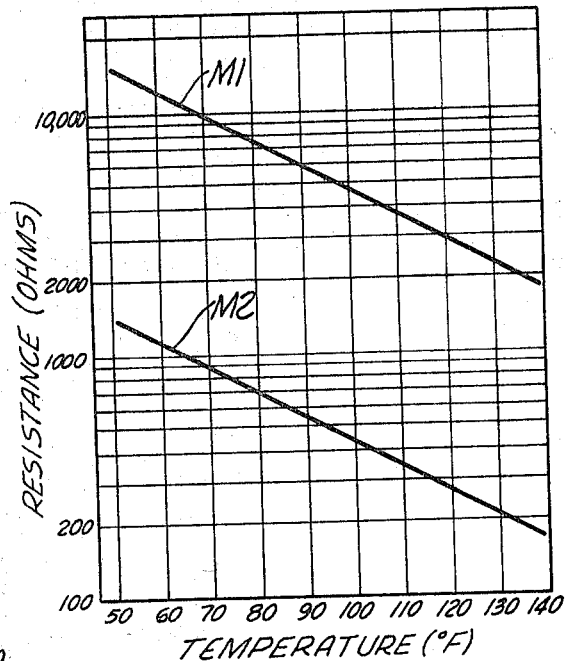
FIG. 4 is a graph representing the resistance temperature characteristics of thermistors employed in an embodiment of the invention.

In a typical age indicator employing this invention, a battery is employed which supplies a voltage of approximately 1.35 volts. The battery is preferably one of the mercury type. The voltage supplied by such a battery is substantially independent of temperature. The thermistor T1 was a type JA38J1 thermistor, manufactured by Fenwal Electronics. The resistor R1 had a fixed resistance of about 1200 ohms which is substantially independent of temperature and the thermistor T2 was a type 28D13 thermistor manufactured by Victor Electronics. The manner in which the resistance of the thermistors, T1 and T2 respectively varied with temperature is indicated by graphs M1 and M2 respectively of FIG. 4. Thermistor T1 had a resistance of 7500 ohms at 80° F. and a resistance of 4300 ohms at 110° F. Thermistor T2 had a resistance of 700 ohms at 80° F. and a resistance of 380 ohms at 110° F.

In this particular unit, a Model 120 PC Curtis meter was employed. This meter had a resistance that varies with the current through it, being about 1500 ohms with a current of 1.0μa. and a resistance of about 140 ohms with a current of 1000 μa. The Curtis meter operated with a current of about 0.6 μa. when the age indicator was at a temperature of 80° F. Indicator marks X are located along the length of the Curtis meter to facilitate measuring the degree of movement of the gap G and hence the change in age of the article. With the circuit elements described the percentage or fraction of standard age units remaining in the object is indicated directly by appropriate numerals 0, 50, 100, or other indicia, on the wall of the cell. In order to utilize the age indicator of this invention to indicate the life consumed or life remaining of an article under test, the device is placed with the article wherever it is stored or used, thereby being exposed to the same temperature history as the article itself. Under these circumstances when the temperature changes, thereby altering the aging rate of the article, the current is altered in a corresponding manner. By suitable calibration, the integrated value of current flowing through the integrator I as a function of time represents the number of standard age units of the specified life that have been consumed.

In Graph G2 of FIG. 1 the time indicated by an ordinate of the graph represents the time required for the gap G to move from the 0 position to the 100 position of the Curtis meter when the age indicator is maintained at the temperature represented by the corresponding abscissa. Thus, if the instrument is maintained at a temperature of 80° F., 6900 hours are required for the gap to move from the 0 position to the 100 position on the meter. This corresponds to the specified life of the film. Likewise, if the age indicator were to be maintained at a temperature of 100° it would require the gap G, 1080 hours to move from one end of the Curtis meter to the other. The movement of the gap from one end to the other indicates that 6900 standard age units have been expended even though the exposure time was only 1080 hours. Regardless of the temperature history of the device the scale in the Curtis meter indicates the percentage of the specified life that has been consumed in terms of standard age units and hence also the percentage of the specified life that remains.

The diode D was one of type 1N4009. When operated in the forward direction in a voltage range of about 0.10 to 0.50 volt, at a fixed temperature of about 80°, the current through the diode doubles for each 30 mv. increase in voltage. In other words, over the voltage range of interest the current was an exponential function of voltage. When operated at fixed voltage, the current through the diode doubles for a 21° F. increase. Since the exact characteristics vary from one type 1N4009 diode to another, the age indicator is calibrated at one temperature by adjustment of the value of the resistor R1 to cause the required current to flow through the indicator I. The value of the current flowing is determined by measuring the voltage across the resistor R2.

In operation, when the temperature of the environment to which the article is exposed increases, the resistance of the two thermistors T1 and T2 both decrease causing a rise of voltage across the shunt circuit RU. A rise in this voltage caused a much larger rise in the current flowing through the microcoulometer I. The percentage change of voltage across the shunt circuit RU produces a much larger percentage change in current through the integrator. In effect a voltage change across the shunt circuit RU produces a magnified, or amplified, current change through the integrator. In this way, it becomes possible to produce large changes of current capable of matching large changes in aging rate. In this way an age indicator is provided which is small, compact, of light weight, and of long life, therefore, making it suitable for use in measuring the deterioration of long-life articles such as photographic film.

In the foregoing description of the invention it has been assumed that the age indicator is exposed to the same temperature history as the article being monitored. In some applications the diode D and integrator I may be located in a space where the temperature is different from that of the article, while the two thermistors T1 and T2 are exposed to the same temperature history as the article. In such a case, account is taken of the temperature difference by utilizing elements having somewhat different characteristics than those described above. In either case, whether the diode be exposed to the same temperature history as the article, or whether it be maintained at a constant temperature, aging rates may be matched by adjusting the voltage across the circuit that includes the diode and indicator as an appropriate function of the temperature of the article.

As a matter of fact, the invention may also be practiced without employing a series thermistor. This may be done, for example, by regulating the current flowing through a diode manually. This may be accomplished, for example, with a circuit like that shown in FIG. 5 in which the thermistor T1 of FIG. 2 has been replaced by a rheostat RH having a movable arm A bearing a pointer movable across a scale SC that has been calibrated with respect to temperature. At each temperature setting, the current through the integrator is approximately proportional to the aging rate of the article being monitored.

Figure 6:
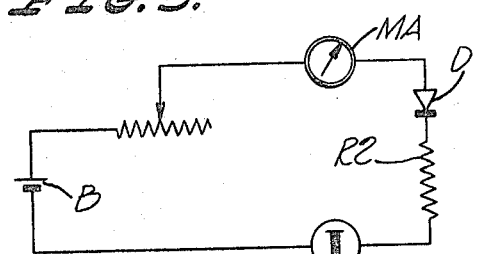

In another embodiment of the invention illustrated in FIG. 6 the rheostat is connected in series with a microammeter MA, a diode D, a protective resistor R2 and an integrator I. The microammeter is calibrated in terms of temperature, so that when the pointer of the microammeter is opposite a point corresponding to that temperature the current flowing through the diode is proportional to the aging rate of the film. The temperatures may be written directly on the meter face if the only one aging characteristic is of concern. Otherwise a calibration table may be employed relating temperature to meter indications.

Figure 5:
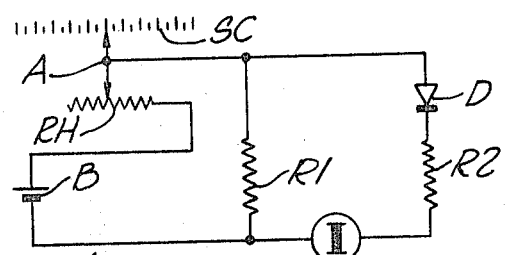
FIGS. 5 and 6 are schematic diagrams of manually adjustable age indicators.

Devices of the type illustrated in FIGS. 5 and 6 are particularly suitable for use where film or some other aging article is exposed for long periods to different temperature conditions and where such changing temperatures can be observed by an attendant so that the current flowing through the integrator I can be adjusted by him intermittently as required. Such devices are also useful where a single device is to be used for monitoring an article having one aging characteristic on one occasion and for monitoring another article having a different aging characteristic on another occasion.

Other types of integrators may be employed which operate on the principle of Faraday's Law. For example, other Faraday Law integrators are known which, in effect, involve the electrochemical transfer of solid metal from one electrode to another. Other types of non-ohmic resistors may also be employed. Likewise, other types of thermistors may be employed.

It is, therefore, to be understood that the invention is not limited to the specific device disclosed but may be embodied in many other forms within the scope of the appended claims.

The invention claimed is:

1. In a device for indicating the cumulative effect of an aging process that depends on temperature,
   two resistors connected in series across a power source, one of said resistors being a thermistor that has a resistance that varies with temperature,
   a non-ohmic resistor and a coulometer connected in series across one of said two resistors, whereby the voltage impressed across the non-ohmic resistor varies with temperature thereby varying the current through the coulometer with temperature.

2. A device as defined in claim 1, wherein said thermistor has a resistance that decreases as the temperature rises whereby the voltage across the other of said two resistors rises as the temperature rises and said non-ohmic resistor and said coulometer are connected across said other resistor.

3. A device as defined in claim 2 wherein said power source is a battery and said non-ohmic resistor comprises a diode and wherein said diode is connected in said circuit in a forward direction.

4. In a device for indicating the cumulative effect of an aging process which depends upon temperature:
   a thermistor and a resistor connected in an electrical circuit across a pair of current input terminals, said circuit having a pair of junctions across which the voltage varies as a function of the temperature to which the device is exposed, and
   a non-ohmic resistor and a coulometer connected across said junctions, whereby the voltage impressed across the non-ohmic resistor varies with temperature thereby varying the current through the coulometer with temperature.

5. An age indicator as defined in claim 4 wherein said non-ohmic resistor is a diode of the semiconductor type.

6. An age indicator as defined in claim 5 wherein said coulometer comprises an electrochemical cell in which a material is accumulated in an area thereof at a rate proportional to the current flowing through the cell.

7. An age indicator adapted to indicate the cumulative effect of an aging process that depends upon temperature comprising a non-ohmic resistor and a coulometer connected in series in a circuit;

means for changing the voltage across said circuit as a function of temperature whereby the voltage impressed across the non-ohmic resistor varies with temperature thereby varying the current through the coulometer with temperature.

8. An age indicator as defined in claim 7 in which said non-ohmic resistor is a diode of the semiconductor type and comprising a battery connected to cause current to flow through said diode in the forward direction.

9. An age indicator as defined in claim 7 in which the current flowing through the non-ohmic resistor is an exponential function of voltage.

10. In a method of measuring the cumulative effect of aging of an article composed of material which is characterized by an aging rate which varies as a function of the temperature to which the article is exposed over a period of time during which the temperature varies, the steps that comprise:

applying a voltage across a non-ohmic resistor, varying the voltage across said resistor as a function of temperature so that the current flowing through said non-ohmic resistor at the respective temperatures corresponds to the aging rate of the material at the respective temperatures, integrating said current as a function of the exposure time of the article to such temperatures, and measuring the resultant integral to indicate the change in the age at a reference temperature.

11. A method of measuring the cumulative effect of aging of an article as defined in claim 10 which comprises:

utilizing as said non-ohmic resistor a semiconductive device having the voltage-current-temperature properties of a semiconductive diode, and applying said voltage to the diode to cause current to flow therethrough in the forward direction.

12. In a method of measuring the cumulative effect of aging of an article composed of a material which is characterized by an aging rate which varies as a function of the temperature to which the article is exposed over a period of time during which the temperature varies, the steps that comprise:

applying a voltage across a non-ohmic resistor, varying the voltage across said resistor as a function of temperature so that the current flowing through said non-ohmic resistor at the respective temperatures corresponds to the aging rate of the article at the respective temperatures, and passing said current through an electrochemical cell for times corresponding to the times for which the article is exposed at the respective temperatures thereby depositing a material at rates corresponding to the respective aging rates at the successive temperatures of exposure; and measuring the amount of material deposited over that period of time to indicate the extent to which the article has aged over that period.

References Cited

UNITED STATES PATENTS

| | | | |
|---|---|---|---|
| 3,092,998 | 6/1963 | Barton | 73—362(TSC) |
| 3,102,425 | 9/1963 | Westman et al. | 73—362(TSC) |
| 3,330,158 | 7/1967 | Simonyan et al. | 73—362(TSC) |
| 3,344,343 | 9/1967 | John | 24—29.5 |
| 3,430,077 | 2/1969 | Bargen | 73—362(TSC) |

LOUIS R. PRINCE, Primary Examiner

F. SHOON, Assistant Examiner

U.S. Cl. X.R.

73—339